Oct. 24, 1933. R. D. DODDS Re. 18,975

SAMPLE TAKING DEVICE

Original Filed July 15, 1918 2 Sheets-Sheet 1

INVENTOR
Rufus D. Dodds
BY
Hardway & Calthy
ATTORNEY

Oct. 24, 1933. R. D. DODDS Re. 18,975

SAMPLE TAKING DEVICE

Original Filed July 15, 1918 2 Sheets-Sheet 2

INVENTOR
Reuben D. Dodds
BY
Hardaway & Cutting
ATTORNEY

Reissued Oct. 24, 1933

Re. 18,975

UNITED STATES PATENT OFFICE 18,975

SAMPLE TAKING DEVICE

Redus D. Dodds, Humble, Tex., assignor to George J. Barrett and S. Robichaux

Original No. 1,295,134, dated February 25, 1919, Serial No. 244,932, July 15, 1918. Application for reissue July 25, 1933. Serial No. 682,159

6 Claims. (Cl. 255—72)

This invention relates to new and useful improvements in a sample taking device.

The object of the invention is to provide a device of the character described, for obtaining samples of the formation through which the drill bit is passing as the boring of the well progresses.

In drilling wells, particularly oil wells, it is often desirable to obtain samples of the formation for the purpose of determining the presence or absence of oil or other minerals. This device has been provided for the purpose of obtaining accurate samples of the formation through which the bit is passing at any depth, and withdrawing the same to the surface for inspection during the process of drilling a well.

With the above and other objects in view, the invention has particular relation to certain novel features of construction, arrangements of parts, and use, an example of which is given in this specification and illustrated in the accompanying drawings, wherein:

Figures 1, 2 and 3, taken in combination, show a vertical sectional view of the device; Fig. 1, showing the upper portion, thereof, Fig. 2, the middle portion, and Fig. 3, showing the lower end thereof.

Figure 1:
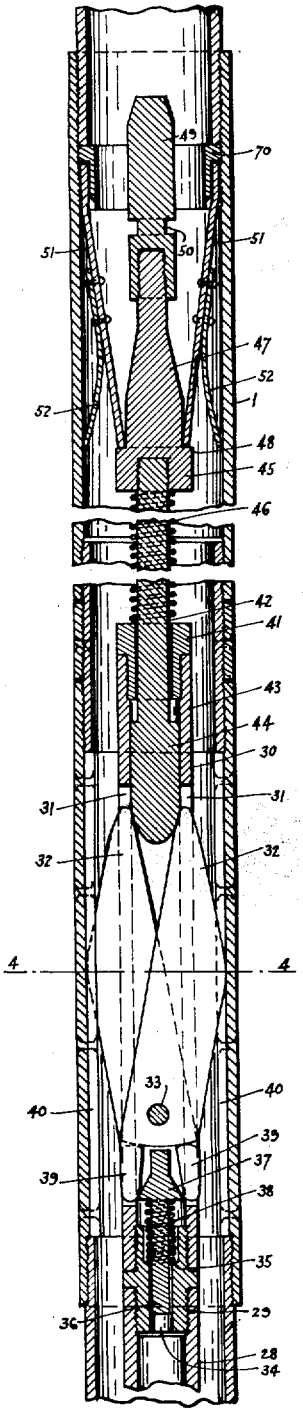
Figure 2:
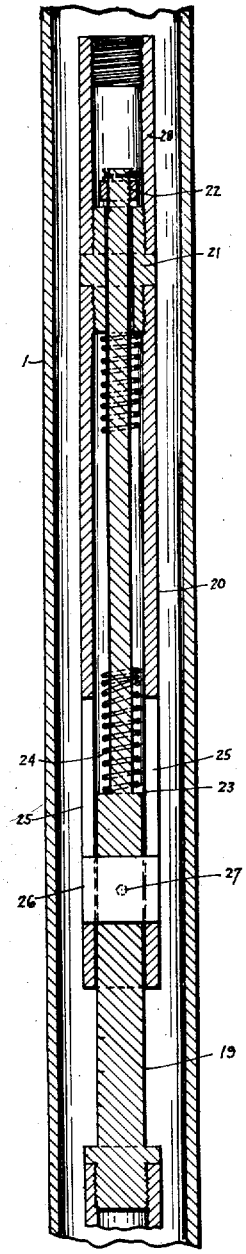

Referring now more particularly to the drawings, wherein like numerals of reference designate similar parts in each of the figures, the numeral 1, refers to a tubular drill stem, having the bit 2 secured to the lower end thereof, in the usual manner. The bit has a vertical bore 3, therethrough, for the purpose hereinafter described, and whose upper end is flared at 4.

The numeral 5, refers to a tubular barrel which extends through the bore 3, of the bit, said barrel having an enlarged section forming a conical shaped shoulder 6, which normally rests in the flared portion 4, of the bore 3. Threaded onto the lower end of the barrel 5 is the boring tool 7, whose lower end is formed into radiating cutters 8, and this boring tool has a central passageway 9, which flares upwardly and threaded into which is the annular anchor 10, to which anchor the trap, hereinafter described, is attached. This trap consists of a hood which is formed of the sections 11, 11, 11. These sections are concave, in form, and when the trap is closed, their adjacent edges fit closely together. Said sections are hinged to the anchor 10, so as to permit them to open to permit the passage of samples, upwardly through the boring tool. The hinged connection of each section 11, with the anchor 10, is formed by means of an extension 12, integral with the section 11, and which fits into the slot 13, out through the upper edge of the anchor. The lower end of the extension 12 has the laterally extending projections 14, 14, which lie in a transverse groove 15, in the anchor 10, forming an extension of the corresponding slot 13. When the sections 11 of the trap are thus attached to the anchor 10, and said anchor screwed into the boring tool 7, the sections 11 are thereby secured against detachment. Secured to the back of each trap section is a flat spring 16, whose free end normally rests against the inner wall of the boring tool 7, to hold the sections of the trap in closed position. The barrel 5 has a check valve 17, near its upper end and above this has fluid outlet passageways 18. The upper end of the barrel 5 is threaded upon the lower end of the rod 19. This rod extends up through the tubular member 20, and its upper end operates through an inserted coupling 21, carried by the upper end of the member 20, and threaded onto the upper end of the rod 19, is the enlarged nut 22, provided to engage against the upper end of the coupling 21, to limit the downward movement of the rod 19. A section of the rod 19 within the member 20 is reduced, forming the annular shoulder 23, and surrounding said reduced portion and interposed between said shoulder and the coupling 21, is the strong coil spring 24. The tubular member 20 has oppositely disposed vertical slots 25, 25, and a key 26, is fitted in an alined slot in the rod 19, and fastened therein by means of the pin 27, said key projecting out beyond the rod 19 on each side and fitting into the slots 25, 25. In case the boring tool 7 should encounter hard formation, which it cannot pierce, the spring 24 will yield, in effect, permitting the withdrawal of the boring tool 7, up into the bit 2, and the bit thus, in effect, reinforces said tool and prevents it from becoming broken off.

To the upper end of the coupling 21, is attached a connecting joint 28, to the upper end of which is attached an internal collar 29, and threaded onto the upper end of this collar is the tubular anchor 30, having the oppositely disposed vertical slots 31, 31, through which the anchor blades 32, 32, project. The blades are pivoted to the anchor 30 at their lower ends, by means of a bearing pin 33, which passes through said anchor and through alined bearings in the lower ends of said blades. The coupling 29 has a central bearing 34, whose upper end is enlarged, forming the annular shoulder 35. A stem 36 operates in the bearing 34, and the upper end of this stem is formed into a conical shaped head 37. Surrounding the stem 36, and interposed between the shoulder 35 and the head 37, is the strong coil spring 38. The lower ends of the blades 32, are formed into fingers 39, 39, and the spring 38 normally holds the head 37, projected between said fingers 39, so as to hold the blades open, and projected through the slots 31, as shown in Fig. 1, and riveted to the inner side of the drill stem are the oppositely disposed vertical ribs 40, 40, which engage against said blades, as the stem rotates, and force the same to rotate therewith, thus driving the boring tool 7. The upper end of the tubular anchor 30 carries a gland 41, through which the rod 42 extends. The lower end of the rod is enlarged forming the annular shoulder 43, and the enlarged head 44, said head fitting within the anchor 30, with sufficient clearance to allow it to move up and down without friction.

Screwed upon the upper end of the rod 42 is the coupling 45, and surrounding the rod 42 and interposed between the gland 41 and the coupling 45 is a strong coil spring 46. The coupling 45 is extended upwardly, forming the reduced neck 47, and the annular shoulder 48, and threaded upon the upper end of the nipple is a cylindrical head 49, whose upper ends is conical shaped, and having the annular groove 50. Within the drill stem 1, are the fingers 51, 51, whose upper ends are hinged to the anchor 70 within the drill stem. The hinged connections of said fingers to said drill stem are formed in the same manner as the hinged connections of the trap sections 11, to the anchor 10, and will not be here further described in detail. The lower end of the fingers 51, 51, are free and are held in engagement with the shoulder 48, by means of the flat springs 52, 52, whose upper ends are secured, respectively, to the fingers and whose lower ends are outwardly curved and rest against the inner wall of the drill stem 1.

Figure 11:
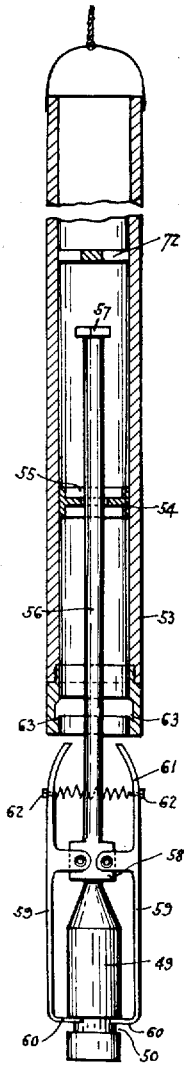
Fig. 11 shows a vertical sectional view of the implement employed, for lowering the device in the stem.

For the purpose of letting the device down into the drill stem, I have provided an implement as shown in Fig. 11, wherein the numeral 53 refers to a tube having a spider 54, fixed therein near its lower end, with a central orifice 55, through which the rod 56, passes, said rod having an enlarged head 57, at its upper end to prevent its detachment from the spider. The lower end of the rod has a head 58, to the opposite sides of which are pivoted the levers 59, 59, the lower ends of said levers being turned inwardly, forming the fingers 60, 60, provided to engage in the groove 50, of the head 49. The upper ends of the levers are arcuate in form, being curved outwardly and interposed between them is the push spring 61, which passes through the rod 56, and is provided to hold the fingers 60 in engagement in said groove. In order to lower the device, into the well, the fingers 80 are engaged over said head as shown in Fig. 11, and the entire device then lowered through the medium of a bailing line attached to the tube 53, the head 57 engaging against the spider 54. The boring tool 7 is thus projected through the bit 2, until the shoulder 6 fits in the flared recess 4. The weight of the implement will then be sustained by the head 49, and is sufficient to overcome the resistance of the spring 46, and force the shoulder 48 below the free ends of the fingers 51, and said free ends will be by the springs 52, forced inwardly to engage the shoulder 48, and at the same time, the lower end of the head 44, will be forced between the upper ends of the blades 42 to hold them locked in engaged position. As the tubing 53 is further lowered, it will pass over the upper ends of the levers 59, 59, and force them together, disengaging the fingers 60 from the head 49. Thereupon the upper end of the rod 56 contacts against the stop 72, fixed thereabove on the tubing 53, and at the same time, catches 62, 62, carried by the outer sides of the upper ends of the said levers 59, engage in corresponding recesses 63, 63, in the inner side of the tubing 53, and the implement may be then lifted out of the well, leaving the device in position for operation in the drill stem 1.

Figure 3:
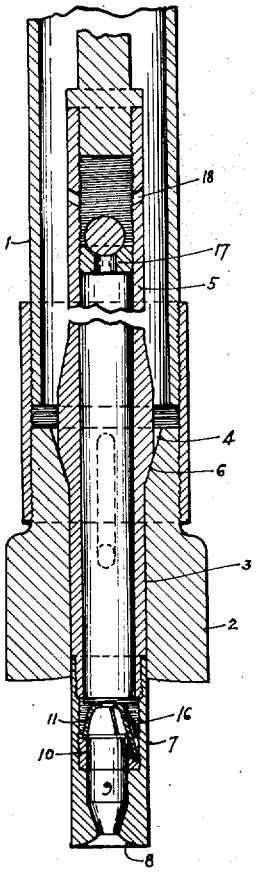
Figure 4:
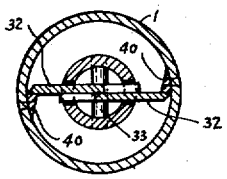
Fig. 4 shows a transverse sectional view, taken on the line 4—4 of Fig. 1.

When the drill stem is rotated, the ribs 40 will engage against the outwardly projecting edges of the blades 32, and will force the sample taking device to rotate with said stem. As shown in Fig. 3, the boring tool 7 runs in advance of the bit 2, and as it passes through the formation, samples of said formation will pass up through the passageway 9, forcing the sections 11 of the trap backwardly and gaining admittance to the interior of the barrel 5. The surplus water admitted passes up through the check valve 17 and out through the water passageways 18.

Figure 12:
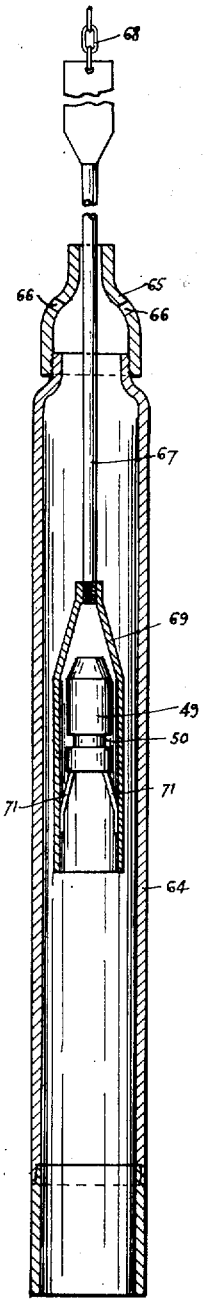
Fig. 12 shows a vertical sectional view of a fishing tool for withdrawing the device from the well.
Figure 9:
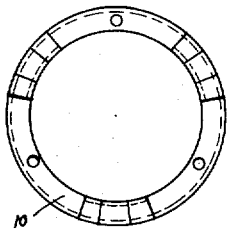
Fig. 9 shows a plan view of the trap anchor.
Figure 7:
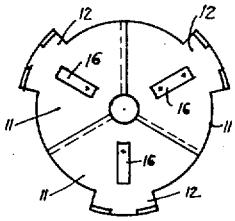
Fig. 7 shows a plan view of the trap employed.
Figure 5:
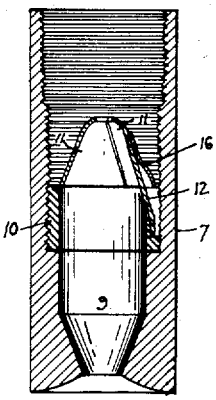
Fig. 5 shows a vertical sectional view of the boring tool.
Figure 6:
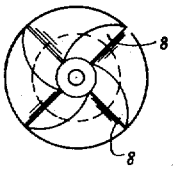
Fig. 6 shows a lower end view thereof.
Figure 10:
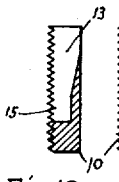
Fig. 10 shows a vertical sectional view thereof.
Figure 8:
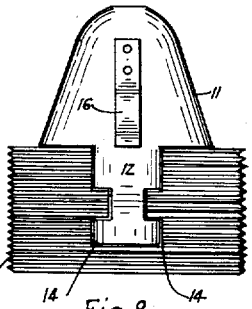
Fig. 8 shows a side elevation of the trap.

In Fig. 12, I have shown a form of fishing tool for withdrawing the device from the drill stem, after the samples of the formation have been trapped in the barrel 5. This tool consists of a casing 64, whose upper end is reduced, forming a bearing 65, and provided with fluid outlets 66, 66. A stem 67 operates through said bearing to the upper end of which a cable 68 is attached. To the lower end of this stem is secured a hood 69, of a size and form to fit over the head 49. Flexible fingers 71, 71, are secured at their lower ends to the inner side of the hood, and their upper ends are free. The fishing tool is let down into the drill stem by means of the cable 68, and the casing 64 passes over the head, and forces the fingers 51, 51, outwardly, disengaging them from the shoulder 48, and releasing the spring 46, which immediately operates to withdraw the head 44 from between the upper ends of the blades 32. The casing then passes on downwardly, engaging against the outer edges of the blades 32, 32, and forcing them inwardly. The lower ends of the fingers 39, 39, operate against the sloped sides of the head 37, which overcomes the pressure of the spring 38, and thereupon the fingers 71, 71, engage under the head 49, as shown in Fig. 12. The entire device may be then withdrawn from the drill stem by an upward pull on the cable 68, carrying with it the samples trapped in the barrel 5.

What I claim is:

1. A rotary drill of the class described in the specification, embodying the combination with a hollow drill stem, and a bit attached to the lower end thereof, having a central bore, of a tubular sample-receiving barrel insertable downwardly in said drill stem into a position passing through said bore, interengaging means carried by the stem and barrel, through which the rotation of the former is imparted to the latter, said interengaging means being disengageable and said barrel being removable upwardly through the drill stem when said interengaging means are disengaged, a boring tool carried by the lower end of the said barrel and normally extending below said bit, a trap within said tool, permitting the admission of the cuttings of said tool into said barrel, and trapping the same within the barrel, and a spring so positioned as to apply a downward pressure upon said tool and to yield upwardly, whereby said tool may withdraw up into said bit when hard formations are encountered by said tool.

2. A rotary drill of the class described in the specification, embodying the combination with a hollow drill stem, and a bit attached to the lower end thereof, having a central bore, of a tubular sample-receiving barrel insertable downwardly in said drill stem into a position passing through said bore, interengaging means carried by the stem and barrel, through which the rotation of the former is imparted to the latter, said interengaging means being disengageable and said barrel being removable upwardly through the drill stem when said interengaging means are disengaged, a boring tool carried by the lower end of the said barrel and normally extending below said bit, and a trap within said tool, permitting the admission of the cuttings of said tool into said barrel, and trapping the same within the barrel, said barrel being movable upwardly a limited distance in said drill stem to permit said tool to withdraw up into said bit when hard formations are encountered, without disengaging said interengaging means.

3. A rotary drill of the class described in the specification, embodying the combination with a hollow drill stem, and a bit attached to the lower end thereof, having a central bore, of a tubular sample-receiving barrel insertable downwardly in said drill stem into a position passing through said bore, interengaging means carried by the stem and barrel, through which the rotation of the former is imparted to the latter, said interengaging means being disengageable and said barrel being removable upwardly through the drill stem when said interengaging means are disengaged, a boring tool carried by the lower end of the said barrel to rotate therewith and normally extending below said bit, a trap within said tool, permitting the admission of the cuttings of said tool into said barrel, and trapping the same within the barrel, and elements interposed between said barrel and said interengaging means, said elements being non-rotatable but longitudinally movable with respect to each other, whereby said barrel may move upwardly a limited distance in said drill stem when said interengaging means are engaged.

4. A rotary drill of the class described in the specification, embodying the combination with a hollow drill stem, and a bit attached to the lower end thereof, having a central bore, of a tubular sample-receiving barrel insertable downwardly in said drill stem into a position passing through said bore, interengaging means carried by the stem and barrel, through which the rotation of the former is imparted to the latter, said interengaging means being disengageable and said barrel being removable upwardly through the drill stem when said interengaging means are disengaged, a boring tool carried by the lower end of the said barrel to rotate therewith and normally extending below said bit, a trap within said tool, permitting the admission of the cuttings of said tool into said barrel, and trapping the same within the barrel, elements interposed between said barrel and said interengaging means, said elements being non-rotatable but longitudinally movable with respect to each other, whereby said barrel may move upwardly a limited distance in said drill stem and said interengaging means are engaged, and a spring associated with said elements to apply a downward pressure upon said tool, and to yield upwardly.

5. A rotary drill of the class described in the specification embodying the combination with a hollow drill stem and a bit attached to the lower end thereof, having a central bore, of a tubular barrel insertable downwardly in said drill stem into a position passing through said bore, interengaging means carried by the stem and barrel, through which the rotation of the former is imparted to the latter, a boring tool carried by the lower end of the said barrel, means so positioned as to apply a downward pressure upon said tool and to yield upwardly, and a trap within said tool, permitting the admission of the cuttings of said tool into said barrel, and trapping the same within the barrel, said interengaging means being disengagable, and said barrel being removable upwardly through said drill stem when said interengaging means are disengaged.

6. A rotary drill of the class described in the specification embodying the combination with a hollow drill stem and a bit attached to the lower end thereof, having a central bore, of a tubular barrel insertable downwardly in said drill stem into a position passing through said bore, interengaging means carried by the stem and barrel, through which the rotation of the former is imparted to the latter, a boring tool carried by the lower end of the said barrel, a trap within said tool, permitting the admission of the cuttings of said tool into said barrel, and trapping the same within the barrel, said interengaging means being formed to permit the barrel to move longitudinally relative to the stem and to maintain such rotary relation during such movement, means so positioned as to apply a downward pressure upon said tool and to yield upwardly, said interengaging means being disengagebale, and said barrel being removable upwardly through said drill stem when said interengaging means are disengaged.

REDUS D. DODDS.